US 9,491,032 B2

(12) United States Patent
Balasubramanian et al.

(10) Patent No.: US 9,491,032 B2
(45) Date of Patent: Nov. 8, 2016

(54) PATTERN COALESCING FOR REMOTE WAKE-ENABLED APPLICATIONS

(71) Applicant: MICROSOFT CORPORATION, Redmond, WA (US)

(72) Inventors: Praveen Balasubramanian, Redmond, WA (US); Poornananda R. Gaddehosur, Bellevue, WA (US); David Garfield Thaler, III, Redmond, WA (US); Dmitry A. Anipko, Seattle, WA (US); Christopher Benjamin Palmer, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 191 days.

(21) Appl. No.: 14/019,243

(22) Filed: Sep. 5, 2013

(65) Prior Publication Data

US 2014/0359167 A1 Dec. 4, 2014

Related U.S. Application Data

(60) Provisional application No. 61/828,663, filed on May 29, 2013.

(51) Int. Cl.
*G06F 15/16* (2006.01)
*H04L 29/06* (2006.01)
(Continued)

(52) U.S. Cl.
CPC ....... *H04L 29/06095* (2013.01); *G06F 1/3209* (2013.01); *H04L 12/12* (2013.01);
(Continued)

(58) Field of Classification Search
CPC ............. H04L 12/12; H04L 29/06095; H04L 67/141; H04L 67/125; H04W 52/0274; H04W 52/0225; H04W 52/0229; H04W 52/028; G06F 1/3209; G06F 1/3287; G06F 1/3203; G06F 9/4418; Y02B 60/34; Y02B 60/1278; Y02B 60/1282
USPC ........ 709/220, 222, 223, 224, 250; 713/300, 713/310, 320, 323, 324; 370/311
See application file for complete search history.

(56) References Cited

U.S. PATENT DOCUMENTS 6,493,824 B1 * 12/2002 Novoa et al. ................. 713/162
7,483,966 B2 1/2009 Cromer et al.
(Continued)

OTHER PUBLICATIONS

"International Search Report & Written Opinion for PCT Patent Application No. PCT/US2013/061076", Mailed Date: Mar. 13, 2014, Filed Date: Sep. 21, 2013, 11 Pages.
(Continued)

*Primary Examiner* — Liangche A Wang
*Assistant Examiner* — Johnny Aguiar
(74) *Attorney, Agent, or Firm* — John Jardine; Judy Yee; Micky Minhas

(57) ABSTRACT

In various embodiments, methods and systems for managing wake-enabled transport connections of wake-enabled applications is provided. A set of ports is designated as a wake-enabled port set. An operating system (OS) of a computing device running applications plumbs the multiport wake pattern to the one or more network interface controllers (NIC) of the computing device. A wake-enabled application acquires a port from the wake-enabled port set. The OS makes a determination that the application is wake-enabled and as such, assigns a port, from the wake-enable port set, to the wake-enabled application. Upon receiving a packet at the NIC, a determination is made whether the packet corresponds to a wake-enabled transport connection based on comparing the packet to the multiport wake pattern. Upon matching the packet to the multiport wake pattern, the NIC communicates with the OS to wake a portion of the wake-enabled application associated with the wake-enabled transport connection.

20 Claims, 4 Drawing Sheets

(51) Int. Cl.
*H04L 12/12* (2006.01)
*H04L 29/08* (2006.01)
*H04W 52/02* (2009.01)
*G06F 1/32* (2006.01)
*G06F 9/44* (2006.01)

(52) U.S. Cl.
CPC .......... *G06F 1/3203* (2013.01); *G06F 1/3287* (2013.01); *G06F 9/4418* (2013.01); *H04L 67/125* (2013.01); *H04L 67/141* (2013.01); *H04W 52/028* (2013.01); *H04W 52/0225* (2013.01); *H04W 52/0274* (2013.01); *Y02B 60/34* (2013.01)

(56) References Cited

U.S. PATENT DOCUMENTS

| | | | |
|---|---|---|---|
| 8,161,301 | B2 | 4/2012 | Lim et al. |
| 8,799,514 | B1* | 8/2014 | Vautrin et al. ................ 709/245 |
| 2002/0083351 | A1 | 6/2002 | Brabenac |
| 2005/0174941 | A1* | 8/2005 | Shanley et al. ............... 370/235 |
| 2006/0252435 | A1* | 11/2006 | Henderson .......... H04L 12/5835 |
| | | | 455/466 |
| 2007/0067445 | A1 | 3/2007 | Vugenfirer et al. |
| 2007/0162777 | A1 | 7/2007 | Imao |
| 2008/0162682 | A1* | 7/2008 | Ramachandran et al. .... 709/223 |
| 2008/0240135 | A1 | 10/2008 | Weast |
| 2008/0301322 | A1* | 12/2008 | Horibe ......................... 709/245 |
| 2009/0210519 | A1* | 8/2009 | Zill et al. ..................... 709/220 |
| 2009/0264149 | A1* | 10/2009 | Miller ................... H04H 60/13 |
| | | | 455/552.1 |
| 2010/0257384 | A1 | 10/2010 | Tsai et al. |
| 2010/0290380 | A1* | 11/2010 | Tsai et al. ..................... 370/311 |
| 2011/0019600 | A1* | 1/2011 | Ping et al. ..................... 370/311 |
| 2012/0005501 | A1* | 1/2012 | Maciocco ......... H04W 52/0206 |
| | | | 713/320 |
| 2012/0120958 | A1* | 5/2012 | Mahadevan et al. ......... 370/392 |
| 2012/0210112 | A1 | 8/2012 | Suganami |
| 2012/0272340 | A1* | 10/2012 | Eldar .............................. 726/34 |
| 2013/0067059 | A1 | 3/2013 | Gatta et al. |
| 2013/0067060 | A1 | 3/2013 | Thaler et al. |
| 2013/0067260 | A1 | 3/2013 | Gatta et al. |
| 2014/0331273 | A1* | 11/2014 | Koneru .................. H04L 63/20 |
| | | | 726/1 |

OTHER PUBLICATIONS

Jimeno, et al., "A Network Connection Proxy to Enable Hosts to Sleep and Save Energy", In IEEE International Conference Performance, Computing and Communications, Dec. 7, 2008, 10 pages.

* cited by examiner

PATTERN COALESCING FOR REMOTE WAKE-ENABLED APPLICATIONS

CROSS REFERENCE TO RELATED APPLICATIONS

This application claims the benefit of, and hereby incorporates by reference, U.S. Provisional Patent Application No. 61/828,663, filed on or about May 29, 2013.

BACKGROUND

Generally, applications may be configured to maintain network connectivity and receive network communications while in a suspended state. Maintaining network connectivity is facilitated by incoming network packets. A packet is matched to a data pattern of an application that is wake-enabled in order to wake the application. A data pattern may refer to a sequence in data packets associated with an application that when recognized wakes the application. In operation, an operating system (OS) that runs the application may plumb a data pattern to a network interface controller (NIC) corresponding to a wake-enabled transport connection of the application. When a received packet matches the data pattern for the transport connection, the NIC will interrupt the OS to resume the suspended application such that the packet is communicated to the application.

Current schemes for waking an application in suspended state suffer from lack of scalability in that each application transport connection requires its own pattern. Further, computing devices today include multiple NICs each configured to support a different and limited number of data patterns. As such, the number of application transport connections that are supported for remote wake functionality may change depending on the active NICs on the computing device. The impact of the above is a limitation on the number of applications that can be configured as wake-enabled applications and also inconsistency in the user experience for wake-enabled applications.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In various embodiments, methods and systems for managing wake-enabled applications are provided. In particular, wake-enabled transport connections of wake-enabled applications are managed based on a multiport wake pattern. A set of ports can be designated as a wake-enabled port set. In embodiments, the wake-enabled port set includes one or more port ranges. The wake-enabled port set can be designated by an OS during a boot up process of the OS. A wildcard pattern (hereinafter "multiport wake pattern") can be assigned to one or more NICs; the OS plumbs the multiport wake pattern to the one or more NICs to support waking wake-enabled applications. The operating system utilizes a single configurable slot/pattern of the NIC with the multiport wake pattern, even though the NIC may be configured to support a limited number of slots/patterns. The one or more NICs may be associated with a computing device running the operating system and/or the wake-enabled applications.

The wake-enabled application can request a port from the operating system during the creation of a wake-enabled transport connection of the wake-enabled application. The OS can make a determination that the transport connection is wake-enabled and as such, assign a port number from the wake-enable port set to the wake-enabled transport connection. Otherwise, if a determination is made that the transport connection is not wake-enabled, a port outside the wake-enabled port set is assigned to the transport connection. In embodiments, a wake-enabled application can be associated with two or more transport connections where at least one transport connection is not wake-enabled. As such, a wake-enabled application can include a first wake-enabled transport connection associated with a port in the wake-enabled port set and a second non-wake-enabled transport connection associated with a port outside the wake-enabled port set.

The multiport wake pattern plumbed to each of the one or more NICs may match each port in the wake-enabled port set. In this regard, when any incoming packet matches a port in the multiport wake pattern at the one or more NICs, the wake-enabled application associated with the wake-enabled transport connection of the matching port is awoken. In particular, when a packet is received, it is determined that the packet corresponds to a wake-enabled transport connection based on matching the packet to the multiport wake pattern. Upon matching the packet to the multiport wake pattern, the NIC wakes, if needed, the operating system up and delivers the packet to the operating system. The operating system wakes at least a portion of the wake-enabled application associated with the wake-enabled transport connection identified based on the port in the multiport wake pattern.

DESCRIPTION OF THE DRAWINGS

The present invention is described in detail below with reference to the attached drawing figures, wherein.

DETAILED DESCRIPTION

Figure 1:
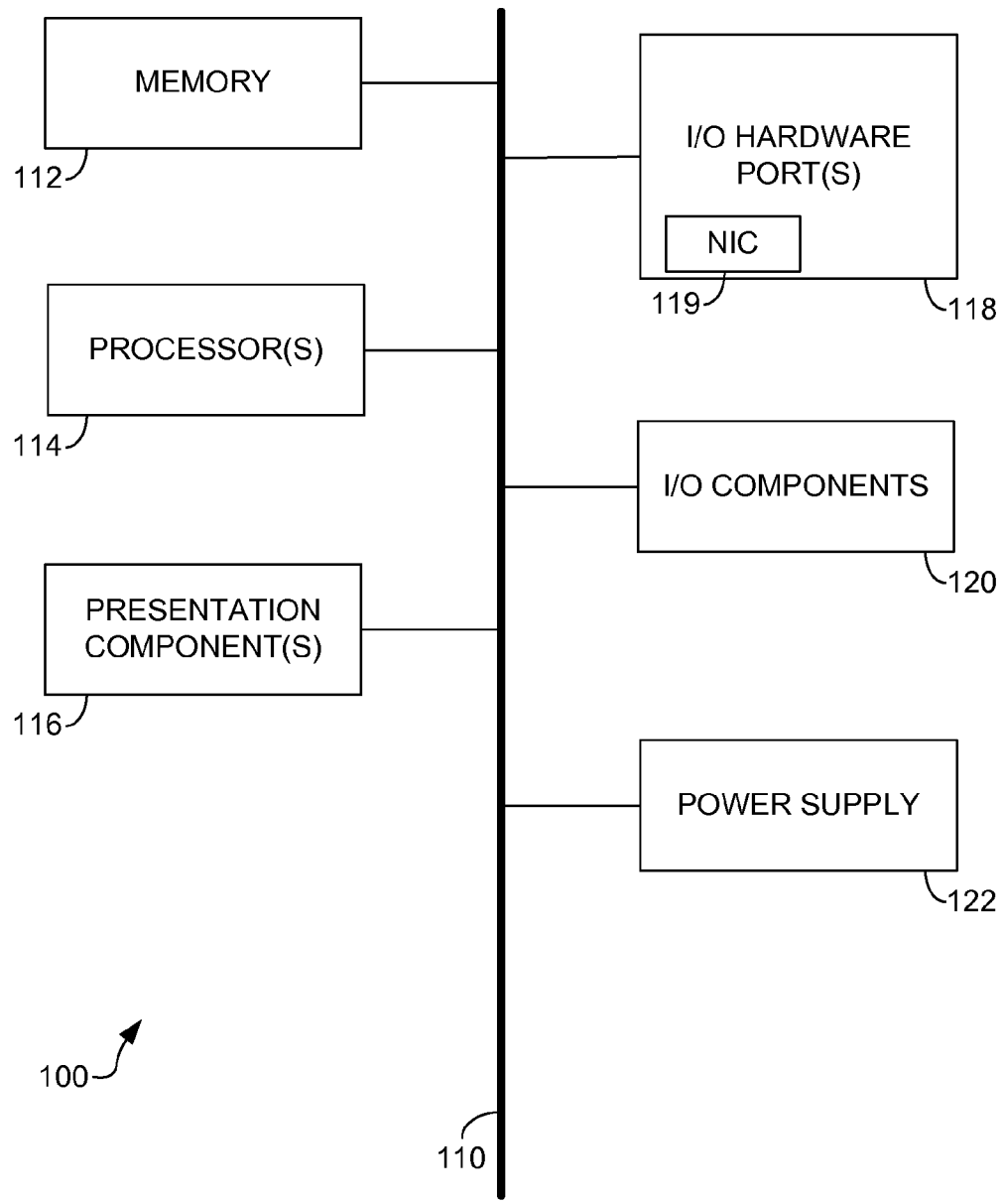
FIG. 1 is a block diagram of an exemplary computing environment suitable for use in implementing embodiments of the present invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, "a feature" is satisfied where one or more features are present. Also, the term "or" includes the conjunctive, the disjunctive and both (a or b thus includes either a or b, as well as a and b).

For purposes of a detailed discussion below, embodiments of the present invention are described with reference to a computing device with one or more NICs and applications running on an OS. Further, while embodiments of the present invention may generally refer to the components described herein, it is understood that an implementation of the techniques described may be extended to other components performing the steps described herein.

Typically, applications may be configured to maintain network connectivity and receive network communications while in a suspended state. Maintaining network connectivity is facilitated by incoming network packets. A packet (i.e., data packet) is matched to a data pattern of an application that is wake-enabled in order to wake the application. A data pattern may refer to a sequence in data packets associated with an application that when recognized wakes the application. In operation, an OS that runs the application may plumb a data pattern to a NIC corresponding to a wake-enabled transport connection of the application. When a received packet matches the pattern for the transport connection, the NIC will interrupt the OS to resume the suspended application such that the packet is communicated to the application.

Embodiments of the present invention are constructed using computer networking principles. A port (e.g., a software port) can be an application-specific, process-specific, or user-specific software construct serving as a communications endpoint in a computer's host operating system. A port is associated with an IP address of the host, as well as the type of protocol used for communication. The purpose of ports is to uniquely identify different applications, processes, or users running on a single computer and thereby enable them to share a single physical connection to a packet-switched network, such as, the Internet. The protocols that primarily use ports are Transport Layer protocols, such as the Transmission Control Protocol (TCP) and the User Datagram Protocol (UDP) of the Internet Protocol suite. A port is identified for each address and protocol by a 16-bit number, commonly known as the port number. A port number may be selected from: The Well-Known Ports, 0 through 1023; The Registered Ports, 1024 through 49151; and The Dynamic and/or Private Ports, 49152 through 65535. The dynamic range is meant for the selection of ephemeral ports. The port number, together with a computer's IP address, completes the destination address for a communications session. That is, data packets are routed across the network to a specific destination IP address, and then, upon reaching the destination computer, are further routed to the specific process bound to the destination port number.

A TCP connection consists of two endpoints, and each endpoint consists of an IP address and a port number. Therefore, when a client user connects to a server computer, an established connection can be thought of as the five-tuple {protocol, local IP address, local port, remote IP address, remote port}. Usually four of the five are readily known—protocol, the client machine uses its own IP address and when connecting to a remote service, the server machine's IP address and server port number are required. What is not immediately evident is that when a connection is established, that the client side of the connection uses a port number. Unless a client program explicitly requests a specific port number (i.e., a port-specific binding), the port number used is an ephemeral port number (i.e., dynamic binding). Ephemeral ports are temporary ports assigned by a machine's IP stack, and are assigned from a designated range of ports for this purpose. When the connection terminates, the ephemeral port is available for reuse, although most IP stacks won't reuse that port number until the entire pool of ephemeral ports have been used.

An OS of a computing device may plumb a data pattern of a transport connection to support a wake-enabled transport connection of a wake-enabled application. The transport connection is associated with the wake-enabled application that registers with the OS for wake functionality. In particular, a developer arranges a contract per application with the OS to indicate certain events and a callback that is to be executed for each of these events. One such event is receipt of a packet that matches a data pattern associated with a particular transport connection created by an application. The data patterns can be configured as a set of bit patterns with a mask. For example, bit patterns having predetermined values with offsets. The offsets and predetermined values at the offsets can be used in determining a match the packet received at a NIC and a data pattern supported at the NIC. If the application is suspended, the OS will resume the suspended application as part of callback execution upon receipt of the packet matching the data pattern. This allows the application to maintain network connectivity while it either operates in the background or while in a suspended state. Unfortunately, an OS may support only the maximum number of data patterns that are supported by a particular NIC. As such, the number of wake-enabled applications is similarly limited to the number of data patterns supported.

Generally, embodiments of the present invention introduce a method for managing wake-enabled applications that increases the number of applications that may be supported using wake-enabled functionality. It is contemplated in embodiments of the present invention that multiple transport connections may be supported by a single multiport wake pattern on a NIC. In this regard, a user may select a plurality of applications for remote wake functionality and a multiport wake pattern having a wake-enabled port set may be used to configure wake-enabled transport connections for each of the applications.

In operation, a multiport wake pattern is plumbed as a data pattern that accounts for multiple source ports (e.g., a wake-enabled port set) in the single data pattern. The multiport wake pattern may be a bit pattern. In embodiments, a reserved port set (e.g., dynamic range) of an OS may be used to configure both a wake-enabled port set (e.g., privileged applications) and a non-wake-enabled range (e.g., non-privileged application). It is contemplated that the reserved port set may include just the wake-enabled port set, as such; the reserved port set and the wake-enabled port set are synonymous in those embodiments. The reserved port set may be associated with an OS, such that, based on a request from an application the OS assigns a port from the reserved port set. The OS may use a port pool per transport protocol (e.g., TCP or UDP). The port may be assigned during the creation of a wake-enabled transport connection of the application. On a computing device with the OS, applications request ports that are provided from ephemeral ports, and in particular, a port is provided from a wake-enabled port set when the transport connection is wake-enabled and non-wake-enabled port set when the transport connection is not wake-enabled In embodiments of the present invention, several methods are contemplated for determining a port set (e.g., the wake-enabled port set). The wake-enabled port set may include a plurality of port numbers that are selected using a variety of different methods. It may simply be a sub-range of the reserved port set which is split between privileged (e.g., wake-enabled port set) and non-privileged transport connections (non-wake-enabled port set). A privileged transport connection may refer to a transport connection configured for remote wake functionality. Further, a wake-enabled port set may be made up of a plurality of sub-ranges. Sub-ranges may be assigned to different privilege groups. In addition, additional granularity is contemplated within embodiments of the present invention, in that, a range or sub-range is associated with a particular user, processor, or application. Any and all such variations of assigning and identifying port sets and ranges for the different types of port sets, and combinations thereof, are contemplated within embodiments of the present invention.

Applications may feature additional functional detail in implementing embodiments of the present invention. As mentioned above, an application may be associated with several different transport connections. As such, when the application is configured as a privileged application, a transport connection assigned a port number may selectively be configured as wake-enabled or not wake-enabled. It is contemplated that the application or other software or hardware based configuration mechanism may be implemented to create a hierarchy of transport connections associated with an application. In this regard, an application with three transport connections may relegate one or more connections such that data patterns on the relegated connection do not wake the application.

In embodiments where dynamic port ranges have been modified for the computing device, the operating system may identify free port ranges starting with the least significant 8 bits set to zero. By way of example, a default bit pattern may be [49152, 49152+255] which in binary translates to [1100000000000000, 1100000011111111]. Also, by way of example, the wake-enabled port set may be chosen to be 256 ports wide to support a plurality of connections per application. In this regard, the wake-enabled port set may be implemented as a range. The wake-enabled port set may be chosen by the TCP/IP stack that consults a port pool manager of the TCP/IP such that the start of the range has the least significant 8 bits set to zero. Selecting ports in this manner facilitates programming the bit multiport wake pattern on the network interface device. Although presented herein as contiguous port ranges, port ranges may also be implemented as non-contiguous ranges. For example, non-contiguous bit masking may provide for non-contiguous range of port numbers. Range masking techniques may further be a function of the particular hardware; however in other implementations may be hardware-independent. For example, the wake-enabled port set may change from machine to machine and not remain static for every implementation of the invention. It is further contemplated that the multiport wake pattern for the wake-enabled port set is constructed so that local and remote IP addresses and the remote port of a 5-tuple packet need not be included in the multiport wake pattern.

Upon receiving a packet, determining that a transport connection is wake-enabled is based on comparing and matching the packet to the multiport wake pattern. In particular, a port in the packet is matched to a port in the wake-enabled port set of the multiport wake pattern. For example, when a packet arrives matching any of the ports in the wake-enabled port set, this triggers identifying the port number and a wake command. Specifically, determining that the transport connection is wake-enabled may also be based on comparing a bit pattern specified in a sequence. Matching and comparing the ports utilizes a bit masking technique where a single multiport wake pattern matches the entire set of wake-enabled ports. When a received packet matches the multiport wake pattern for a wake-enabled transport connection assigned a port from the wake-enabled port set, the NIC will interrupt the OS to wake the suspended application such that the packet is communicated to the application.

Accordingly, embodiments of the present invention provide a simple and efficient method for managing wake-enabled applications. In particular, wake-enabled transport connections of wake-enabled applications are managed based on a multiport wake pattern. A packet may be received at a NIC. The packet includes a port number for the intended communication with an application. As such, an intended application for the packet may be determined. In embodiments, the NIC may traverse a transport connection table to determine the application. The application may be associated with a computing device with an OS. The computing device may include one or more additional NICs. Each NIC may be configured with a multiport wake pattern comprising the wake-enabled port set. The packet with the port number may be matched with a multiport wake pattern plumbed on the NIC, where the packet is matched to any port in the wake-enabled port set of the multiport wake pattern. Upon identifying a match between the packet and the multiport wake pattern of the NIC, the wake-enabled application associated with the transport connection receiving the packet is woken. In this regard, a single multiport wake pattern in an existing NIC on a computing device may enable remote wake for several transport connections with a local port in the designated wake-enabled port set. Each existing NIC on a computing device may be configured to support the same number of transport connections.

Accordingly, in a first aspect of the present invention, one or more computer-readable media storing computer-useable instructions that, when used by one or more computing devices, cause the one or more computing devices to perform a method for managing wake-enabled applications is provided. The method includes receiving a packet. The method also includes determining that the packet corresponds to a wake-enabled transport connection of a wake-enabled application, based on comparing the packet to a multiport wake pattern. The multiport wake pattern includes a wake-enabled port set. The method further includes waking at least a portion of the wake-enabled application associated with the wake-enabled transport connection.

In a second aspect of the present invention, a system for managing wake-enabled applications is provided. The system includes an operating system configured for reserving a reserved port set having a wake-enabled port set and a non-wake-enabled port set. The operating system is also configured assigning ports to applications, and in particular, for assigning a port from the reserved port set based on a determination that a transport connection of an application is wake-enabled and assigning a port from the non-wake-enabled port set when it is determined that the transport connection is not wake-enabled. The operating system is further configured for plumbing a multiport wake pattern that includes the wake-enabled port set. In an exemplary embodiment, the multiport wake pattern is plumbed as a bit pattern with a mask, wherein the multiport wake pattern is a single bit pattern that supports wake functionality for multiple source ports in the wake-enabled port set. The system also includes a multiport wake pattern component having a network interface controller; the multiport wake pattern is configured for receiving a packet. The multiport wake pattern is also configured for matching the packet to the multiport wake pattern. The multiport wake pattern is further configured for facilitating waking at least a portion of the wake-enabled application associated with the wake-enabled transport connection. The system also includes a wake-enabled application configured for receiving a wake command such that at least of portion of the wake-enabled application is awoken.

In a third aspect of the present invention, a computer-implemented method for managing wake-enabled transport connections of wake-enabled applications based on multiport wake patterns is provided. The method comprises receiving a packet. The packet is matchable to a multiport wake pattern. The multiport wake pattern includes a wake-enabled port set. The method further includes determining that packet matches a multiport wake pattern, the packet corresponding to a wake-enabled transport connection of a wake-enabled application. The method also includes waking at least a portion of the wake-enabled application associated with the wake-enabled transport connection. Waking the portion of the wake-enabled application comprises: identifying a port and an IP address in the packet and matching the port and the IP address to the wake-enabled application.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output hardware ports 118 including a NIC 119, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O hardware ports 118 allow computing device 100 to be logically coupled to other devices including I/O components 120, some of which may be built in. Illustrative components include a microphone, joystick, game pad, satellite dish, scanner, printer, wireless device, etc. I/O hardware ports serve as a physical interface; the physical interface may be a specialized outlet on a piece of equipment to which a plug or cable connects. Port connectors may be male or female. A particular type of I/O hardware port can be found in a network interface controller (e.g., NIC 119) that serves as a computer hardware component that connects to a computer network. In embodiments, the NIC is a wireless component. I/O hardware ports can be distinguished from software ports (hereinafter "port") that in computer networking are application-specific, user-specific, or process-specific software constructs serving a communication endpoint in a computer's host operating system. A NIC (e.g., NIC 119) implements the electronic circuitry required to communicate using a specific physical layer and data link layer standard.

Figure 2:
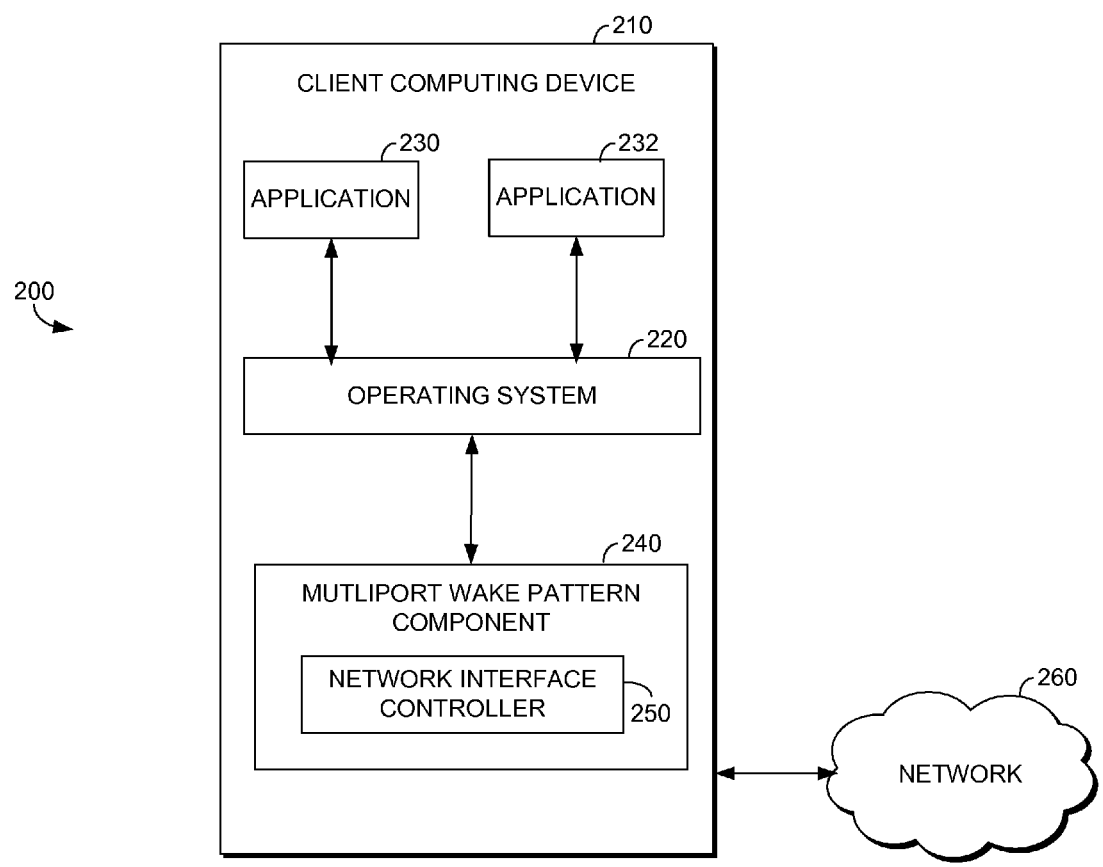
FIG. 2 is a block diagram of an exemplary computing system in which embodiments of the invention may be employed.

With additional reference to FIG. 2, a block diagram depicting an exemplary computing system 200 suitable for use in embodiments of the invention described. Generally, the computing system 200 illustrates an environment in which the managing of wake-enabled applications is enabled. In particular, embodiments of the present invention provide systems and methods for using a wake-enabled port set to configure wake-enabled applications and associated NICs for supporting remote wake of the wake-enabled applications. Among other components not shown, the computing system 200 generally includes a client computing device 210, an operating system 220, an application 230 and an application 232, a multiport wake pattern component 240 having a network interface controller 250 and a network 260. The network 260 may include, without limitation, one or more local area networks (LANs) and/or wide area networks (WANs). Such networking environments are commonplace in offices, enterprise-wide computer networks, intranets and the Internet. Accordingly, the network 260 is not further described herein.

In some embodiments, one or more of the illustrated components/modules may be implemented as stand-alone applications. Any number of client computing devices, network interface controllers, applications, and multiport wake pattern components may be employed in the computing system 200 within the scope of embodiments of the present invention. Each may comprise a single instance or multiple instances cooperating in a distributed environment. Additionally, other components/modules not shown also may be included within the computing system 200.

It should be understood that this and other arrangements described herein are set forth only as examples. Other arrangements and elements (e.g., machines, components, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

With continued reference to FIG. 2, the client computing device 210 may include any type of computing device, such as the computing device 100 described with reference to FIG. 1, for example. By way of example only, client computing device 210 may be a desktop personal computer, a laptop computer, a cellular telephone, a PDA, or any other client computing device. The client computing device 210 may include an operating system 220, an application 230 and an application 232, and a multiport wake pattern component 240. It should be noted, however, that the systems and method described herein are not limited to implementation on such computing devices, but may be implemented on any of a variety of different types of computing devices within the scope of hereof.

The operating system 220 may manage the resources of the client computing device 210. The operating system 220 may provide functionality for resources including application 230 and an application 232, multiport wake pattern component 240, a network interface controller 250. The operating system 220 may provide resource management for both hardware and software components that support network connection functionality of the client computing device 210. The operating system 220 is responsible for reserving a set of ports for implementing embodiments of the present invention. The reserved port set may be reserved from the dynamic port range of the operating system 220. The reserved port set may include both a wake-enabled port set and non-wake-enabled port set.

Further, the operating system 220 is configured for plumbing a multiport wake pattern that includes the wake-enabled port set. In an exemplary embodiment, the multiport wake pattern is plumbed as a bit pattern with a mask. A plumbed multiport wake pattern may include an offset (that applies to the pattern and the mask), a size (that applies to the pattern and the mask) and a string of bits of the indicated size. The multiport wake pattern is a single bit pattern that supports wake functionality for multiple source ports in the wake-enabled port set. When a packet matches the multiport wake pattern the operating system 220 receives the packet received to wake a portion of a wake-enabled application. The operating system 220 can be configured to compare an identified destination port and IP address in the packet with applications that have opened ports to identify a wake-enabled application. The wake-enabled application is associated with a wake-enabled transport connection that corresponds to the packet.

The operating system 220 is also responsible for responding to requests from wake-enabled applications during port acquisition (e.g., creating a transport connection). A wake-enabled application, based on a determination that a transport connection of the wake-enabled application is wake-enabled, is assigned a port from the wake-enabled port set. Operating system 220 may further assign a port number based on the specific application, process, or user. Each application, process, or user may also be associated with different subsets of the reserved port set, as such, ports can be specifically assigned based on a determination of the type of application, process, or user and a corresponding range for the application, process, or user. Any variations and combinations thereof are contemplated with embodiments of the present invention.

The network interface controller 250 of the multiport wake pattern component 240 is responsible for managing connectivity of the client computing device 210 to the network 260. The network interface controller 250 is also responsible for receiving packets of network traffic from network. The network interface controller 250 may receive a packet that is matched to a multiport wake pattern to determine whether or not to wake an application (e.g., application 230 or 232). That means one tuple with 5 elements. The elements of a 5-tuple connection includes: Protocol, Source IP address, Source Port, Target IP address, and Target port. For example, a TCP connection can be defined by the following 5-tuple: {TCP, 10.9.8.7, 23, 10.11.12.13, 2345}. The network interface controller 250 may include, among others, a wireless network interface or an Ethernet network interface. A plurality of network interface controllers 250 may be associated with a single client computing device 210. In embodiments, the network interface controller 250 performs the additional functions of the multiport wake pattern component 240 described below.

With continued reference to FIG. 2, applications 230 and 232 may be applications that are configured to respond to remotely triggered actions. For example, access to local files, access to a desktop graphic user interface, or establishing a two-way communication with a user via a voice over IP (VOIP) call. Applications 230 and 232 may each be associated with a plurality of transport connections. Not all transport connections may be enabled for waking the application. In this regard, the application may function with transport connections that are wake-enabled and transport connections that are not wake-enabled. This may be implemented via a hierarchy scheme as part of the application or other configuration mechanism of the operating system 220. Applications 230 and 232 may be configured to request a port number during a port acquisition process (e.g., creation of a transport connection). In this regard, the application, and the transport connection in particular, is assigned a port number from either the wake-enabled port set or the non-wake-enabled port set.

The multiport wake pattern component 240 is responsible for waking one or more applications (e.g., application 230 or application 232). At a basic level, multiport wake pattern component 240 may match the port of a packet to any of the ports in the wake-enabled port set based on a comparison with a multiport wake pattern. In particular, a multiport wake pattern may be a bit pattern that is compared and matched to a packet. A multiport wake pattern may include an offset (that applies to the pattern and the mask), a size (that applies to the pattern and the mask) and a string of bits of the indicated size. In operation, comparing and matching the packet and the plumbed multiport wake pattern is based on, by way of example, an exact bit-for-bit match. That is, if a given bit in the mask is set, then the corresponding bit in the pattern must match the corresponding bit in the packet. If a given bit in the mask is clear, no comparisons of the corresponding bits in the pattern and packet is done. Any variations and combinations of comparing and matching the packet to the multiport bit pattern of the NIC are contemplated with embodiments of the present invention.

It is further contemplated the multiport wake pattern component may support multiple IP addresses in embodiments of the present invention. For example, a NIC that supports two separate IP addresses for the same computing device may be programmed to support specific binding of an application on a first IP address and support dynamic binding with multiport wake pattern techniques described herein on a second IP address. Any variations and combinations of separating specific binding from multiport wake patterns based on multiple IP addresses of a computing device are contemplated with embodiments of the present invention.

The multiport wake pattern component 240 is further responsible for waking at least a portion of the wake-enabled application associated with a wake-enabled transport connection of a wake-enabled application. The multiport wake pattern component 204 may interrupt the operating system 220. In embodiments, the multiport wake pattern component may be configured to wake the system up and deliver the packet to the OS. It is contemplated that, like the OS, the multiport wake pattern may further be configured to compare an identified destination port and IP address in the packet with applications that have opened ports to identify a wake-enabled application. An application can be awoken from a suspended state to indicate the packet to the application. A wake command may be received at the application to wake the application from the suspended state. Other implementations of waking the application are also contemplated with embodiments of the present invention.

Figure 3:
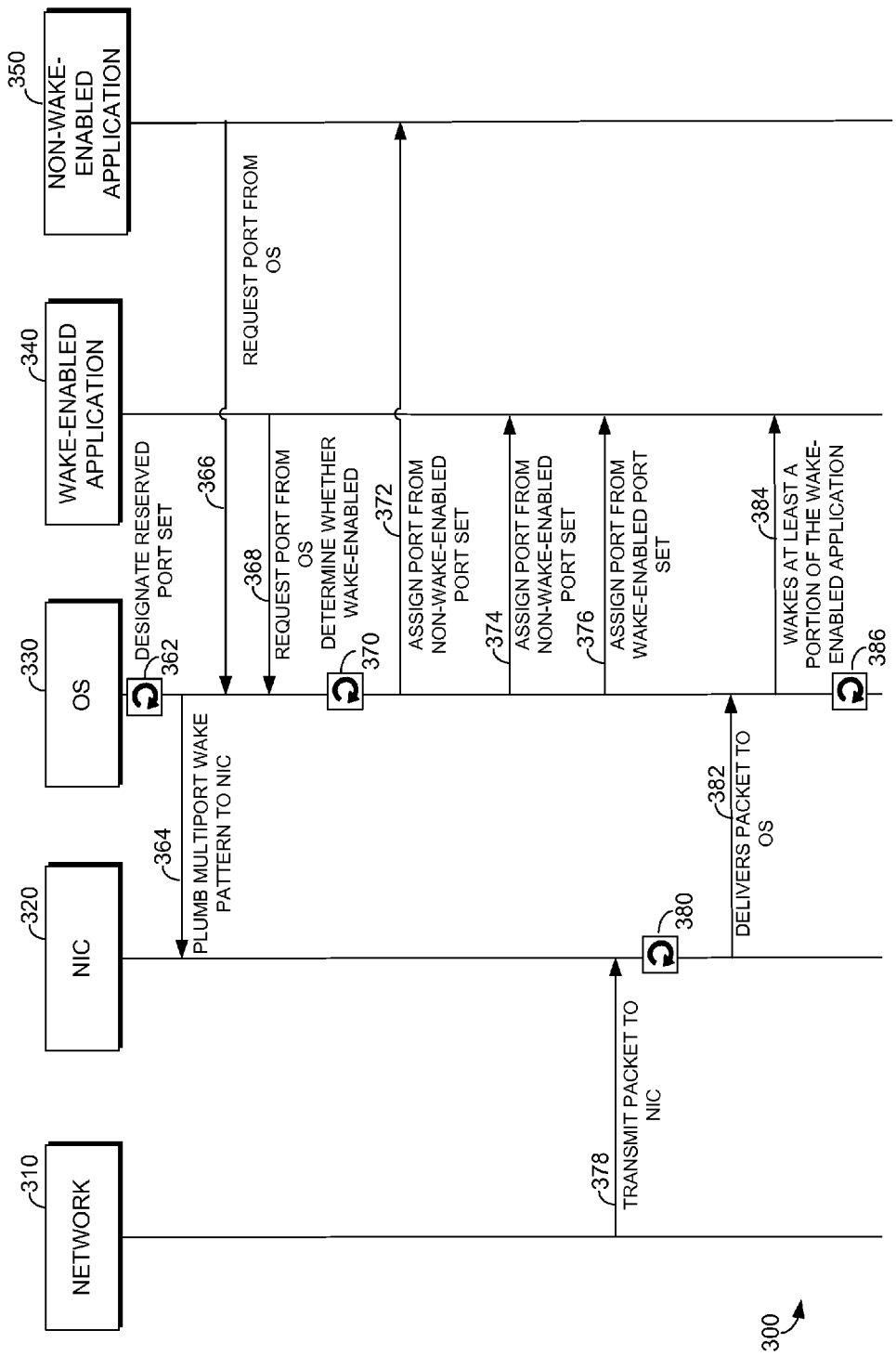
FIG. 3 is a flow diagram showing a method for managing wake-enabled applications, in accordance with embodiments of the present invention.

Turning now to FIG. 3, a flow diagram is provided that illustrates a method 300 for managing wake-enabled transport connections of wake-enabled applications based on a multiport wake pattern. The components illustrated in FIG. 3 include a network 310, a NIC 320, an operating system 330, a wake-enabled application 340 and a non-wake enabled application 350. The OS 330 designates 362 a reserved port set. The reserved port set includes a wake-enabled port set and a non-wake-enabled port set. Each of the port sets may include one or more port ranges. The OS 330 can designate a reserved port set during a boot up process of the OS. The OS 330 plumbs 364 a multiport wake pattern to one or more NICs (e.g., NIC 320) of a computing device running the operating system. The non-wake-enabled application 350 may request 366 a port from the OS 330 and the wake-enabled application may request 368 a port from the OS 330. The requests to acquire a port may be generated during the creation of a transport connection. The OS 330 determines 370 whether an application is wake-enabled or not-wake-enabled, and in particular, whether a transport connection of an application is wake-enabled. The OS 330 determines whether a transport connection of an application is wake-enabled such that the OS 330 assigns 372 a port from the non-wake-enabled port set to the non-wake-enabled transport connection of the non-wake-enabled application, assigns 374 a port from the non-wake-enabled port set to a non-wake-enabled transport connection of the wake-enabled application, and assigns 376 a port from the wake-enabled port set to a wake-enabled transport connection of the wake-enabled application.

The network 310 transmits 378 a packet to the NIC 320. The NIC receives 380 the packet and determines whether the packet matches the multiport wake pattern of the NIC 320. It is contemplated the packet corresponds to a wake-enabled transport connection when a port in the packet matches an identified port in the multiport wake pattern, the identified port is in the wake-enabled port set of the multiport wake pattern. Upon matching the packet to the multiport wake pattern, the NIC 320 facilitates waking least a portion of the application. In particular, the NIC 320, if needed, wakes the OS 330, and then delivers 382 the packet to the OS 330 such that the wake-enabled application is woken. The OS 330 wakes 384 at least a portion of the wake-enabled application based on an identified destination port and IP address in the packet. It is contemplated that OS 330 may queue 386 the packet for delivery to the transport connection such that the packet is delivered when the application requests the packet.

Figure 4:
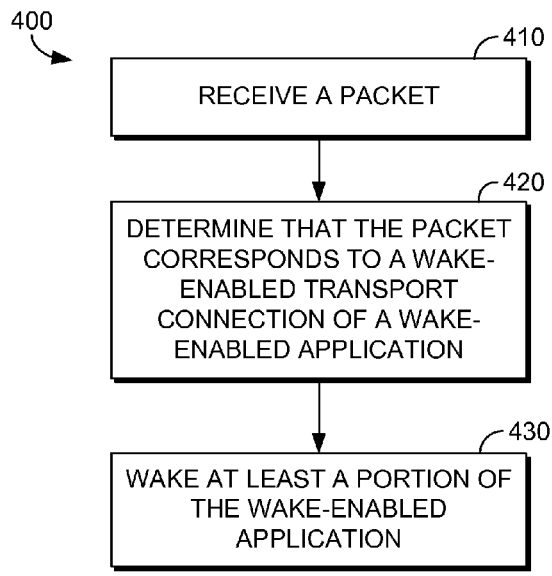
FIG. 4 is a flow diagram showing a method for managing wake-enabled applications, in accordance with embodiments of the present invention.

With continued reference to FIG. 4, a flow diagram is provided that illustrates a method 400 for managing wake-enabled transport connections of wake-enabled applications based on a multiport wake pattern. At block 410, a packet is received. At block 420, it is determined that that the packet corresponds to a wake-enabled transport connection of a wake-enabled application, based on comparing the packet to a multiport wake pattern. The multiport wake pattern includes a wake-enabled port set. At block 430, at least a portion of the wake-enabled application is woken on a port of the wake-enabled transport connection.

Figure 5:
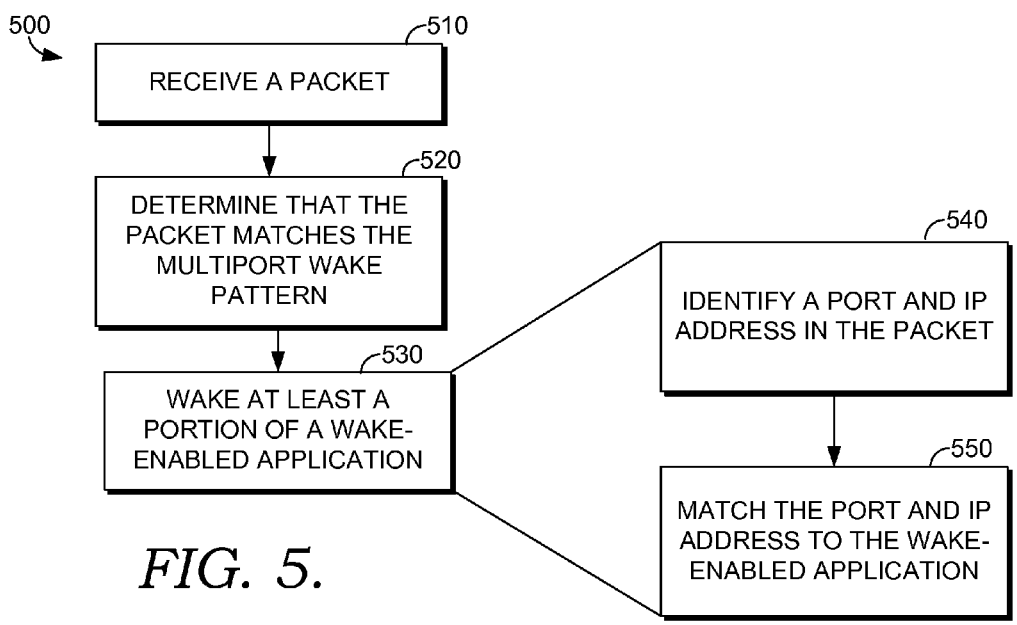
FIG. 5 is a flow diagram showing a method for managing wake-enabled applications, in accordance with embodiments of the present invention.

With continued reference to FIG. 5, a flow diagram is provided that illustrates a method 500 for managing wake-enabled transport connections of wake-enabled applications based on a multiport wake pattern. At block 510, a packet is received. The packet is matchable to a multiport wake pattern. The multiport wake pattern includes a wake-enabled port set. At block 520, it is determined that the packet matches the multiport wake pattern. At block 530, at least a portion of the wake-enabled application associated with the wake-enabled transport connection is woken. Waking the wake-enabled transport connection further comprises at block 540, identifying a port and an IP address in the packet, and at block 550, matching the port and the IP address to the wake-enabled transport connection that uses a port matched in the multiport wake pattern.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. One or more computer storage media storing computer-useable instructions that, when used by one or more computing devices, cause the one or more computing devices to perform operations for managing wake-enabled applications, the operations comprising:
   receiving a packet, wherein the packet is matchable to a multiport wake pattern, and the multiport wake pattern corresponds to a reserved port set having at least a wake-enabled port set, the wake-enabled port set is assigned to a network controller interface as a wake pattern through the multiport wake pattern;
   determining that the packet corresponds to a wake-enabled transport connection of a wake-enabled application, based on identifying that a port in the packet matches a port in the wake-enabled port set, wherein the multiport wake pattern is a wild card pattern corresponding to the wake-enabled port set comprising a plurality of ports, and the plurality of ports are assigned to wake-enabled applications to support wake functionality via the network controller interface based on the multiport wake pattern and corresponding ports of the wake-enabled applications; and
   waking at least a portion of the wake-enabled application associated with the wake-enabled transport connection, wherein waking the wake-enabled application comprises:
      identifying the port and an IP address in the packet; and
      matching the port and the IP address to the wake-enabled transport connection that uses a port matched in the wake-enabled port set via the multiport wake pattern.

2. The media of claim 1, wherein the packet is received when the wake-enabled application is in a suspended state.

3. The media of claim 1, wherein a port of the wake-enabled transport connection is assigned from the wake-enabled port set to the wake-enabled transport connection when creating the wake-enabled transport connection.

4. The media of claim 1, wherein the multiport wake pattern is assigned as a bit pattern with a mask, wherein the multiport wake pattern is a single bit pattern supporting wake functionality for multiple source ports in the wake-enabled port set.

5. The media of claim 4, wherein comparing the packet to the multiport wake pattern comprises:
   identifying the port in the packet; and
   matching the port in the packet to a port in the wake-enabled port set associated with the multiport wake pattern using bit masks of the multiport wake pattern, the multiport wake pattern based on the bit masks is matchable to an entire set of the wake-enabled port set.

6. The media of claim 4, wherein the wake-enabled port set is a non-contiguous port range.

7. The media of claim 4, wherein the wake-enabled port set is a contiguous port range.

8. The media of claim 4, wherein a selected port or port set from the set of wake-enabled port set is selected specifically for one of the following:
   a user;
   a process; and
   an application.

9. The media of claim 1, wherein waking at least a portion of the wake-enabled application comprises transitioning the wake-enabled application from a suspended state to an active state.

10. A system to manage wake-enabled applications, the system comprising:
   a processor and a memory configured for providing computer program instructions to the processor;
   an operating system configured to:
      reserve a reserved port set having a wake-enabled port set and a non-wake-enabled port set;
      assign a port from the reserved port set; and
      assign a multiport wake pattern corresponding to the wake-enabled port set, wherein the multiport wake pattern is a wild card pattern supporting wake functionality for multiple source ports in the wake-enabled port set, the wake-enabled port set is assigned to a network controller interface as a wake pattern through the multiport wake pattern;
   a multiport wake pattern component having a network interface controller, the multiport wake pattern component configured to:
      receive a packet;
      determine that the packet corresponds to a wake-enabled transport connection of a wake-enabled application, based on identifying that a port in the packet matches a port in the wake-enabled port set; and
      facilitate waking at least a portion of the wake-enabled application associated with the wake-enabled transport connection, wherein waking the wake-enabled application comprises:
         identifying the port and an IP address in the packet; and
         matching the port and the IP address to the wake-enabled transport connection that uses a port matched in the wake-enabled port set via the multiport wake pattern; and
   a wake-enabled application configured to:
      receive a wake command to wake at least a portion of the wake-enabled application.

11. The system of claim 10, wherein the operating system dynamically determines the reserved port set, wherein the reserved port set is not hardcoded to the operating system.

12. The system of claim 10, wherein the operating system includes a known reserved port set comprising the wake-enabled port set and the non-wake-enabled port set, wherein the operating system configures transport connections for one or more applications not specifically bound to a port number.

13. The system of claim 10, wherein the operating system supports a plurality of network interface controllers, wherein each of the network interface controllers is assigned the multiport wake pattern.

14. The system of claim 10, wherein the multiport wake pattern component is further configured to:
support a plurality of internet protocol (IP) addresses, wherein a first IP address supports one or more specific-bind wake-enabled applications and a second IP address supports one or more dynamic-bind wake-enabled applications, and wherein the second IP address supports multiport wake patterns.

15. The system of claim 10, the multiport wake pattern component is further configured to:
deliver the packet to the operating system to wake the wake-enabled application; and
the operating system is further configured to:
wake at least a portion of the wake-enabled application associated with the wake-enabled transport connection operating based on the port, the port is matched in the multiport wake pattern; and
queue the packet for delivery to the wake-enabled transport connection.

16. The system of claim 10, wherein the operating system is further configured to:
assign the port from the wake-enabled port set upon a determination that a transport connection is wake-enabled; and
assign the port from the non-wake-enabled port set upon a determination that a transport connection is not wake-enabled.

17. A computer-implemented method for managing wake-enabled transport connections of wake-enabled applications based on multiport wake patterns, the method comprising:
receiving a packet, wherein the packet is matchable to a multiport wake pattern, and the multiport wake pattern corresponds to a reserved port set having at least a wake-enabled port set, the wake-enabled port set is assigned to a network controller interface as a wake pattern through the multiport wake pattern;
determining that the packet matches the multiport wake pattern based on identifying that a port in the packet matches a port in the wake-enabled port set, wherein the multiport wake pattern is a wild card pattern corresponding to the wake-enabled port set comprising a plurality of ports, wherein the packet corresponds to a wake-enabled transport connection of a wake-enabled application;
waking at least a portion of the wake-enabled application associated with the wake-enabled transport connection, wherein waking the wake-enabled application comprises:
identifying the port and an IP address in the packet; and
matching the port and the IP address to the wake-enabled transport connection that uses a port matched in the wake-enabled port set via the multiport wake pattern.

18. The method of claim 17, wherein the multiport wake pattern is assigned as a bit pattern, having bit masks, to each of a plurality of network interface controllers, wherein a single wake slot of each of the plurality of network interface controllers supports the multiport wake pattern.

19. The method of claim 18, wherein the multiport wake pattern is constructed to obviate a local Internet Protocol (IP) address and a remote IP address from being included in the multiport wake pattern.

20. The method of claim 19, wherein the wake-enabled port set is selected as a range of ports, wherein a start of the range has a set of 8 least significant bits, the set of least significant 8 bits set to zero.

* * * * *